Figure 1:
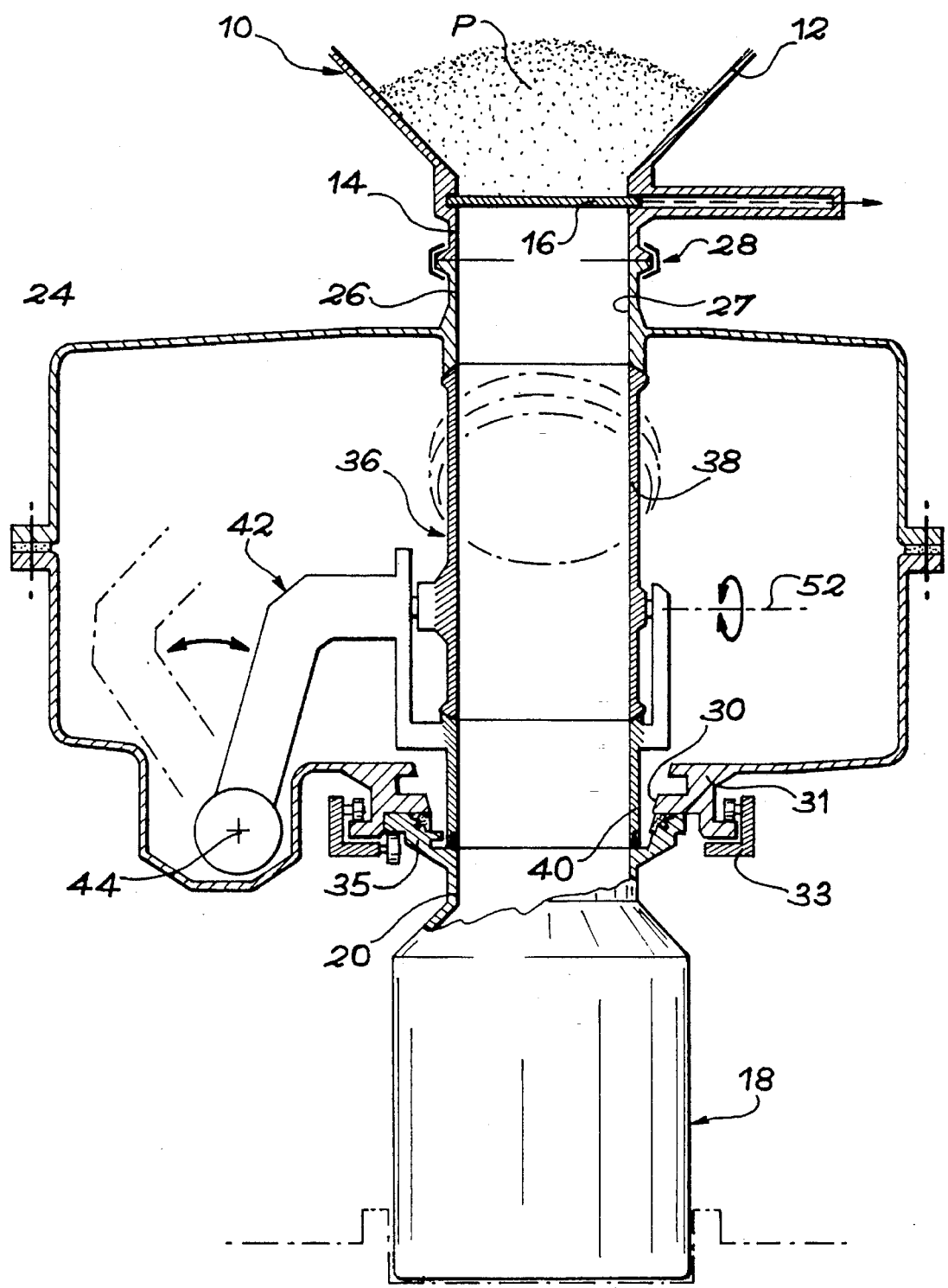

United States Patent [19]

Glachet

[11] Patent Number: 5,588,473
[45] Date of Patent: Dec. 31, 1996

[54] INTERFACE DEVICE FOR THE TRANSFER OF FLUID PRODUCTS BETWEEN TWO CONTAINERS

[75] Inventor: Charles Glachet, Vendôme, France

[73] Assignee: Sne La Calhene, Velizy Cedex, France

[21] Appl. No.: 451,130

[22] Filed: May 25, 1995

[30]    Foreign Application Priority Data

May 31, 1994 [FR] France ..................... 94 06608

[51] Int. Cl.⁶ .................................................. B65B 1/04
[52] U.S. Cl. ............................. 141/387; 141/98; 141/384; 141/292
[58] Field of Search ................................. 141/93, 98, 292, 141/312, 346, 348, 349, 350, 387, 384, 383

[56]                  References Cited

U.S. PATENT DOCUMENTS 3,605,831   9/1971   Mitchell et al. .
3,896,855   7/1975   Grieger et al. .
5,263,521  11/1993   Brossard et al. .

FOREIGN PATENT DOCUMENTS 2673990   9/1992   France .
1199186   3/1966   Germany .

*Primary Examiner*—David J. Walczak
*Assistant Examiner*—Steven O. Douglas
*Attorney, Agent, or Firm*—Pearne, Gordon, McCoy & Granger

[57]                  ABSTRACT

In order to transfer fluid products such as powders between a storage container (10) and a mobile container (18) an interface device comprising a tight chamber (24) is proposed. This tight chamber contains mechanisms making it possible either to seal an access opening (30) to the mobile container (18), or place a transfer tube (36) between the containers (27, 30). The transfer tube is formed by at least two sections (38, 40) having an internal cross-section which is substantially uniform and identical, so that a product can be transferred in any random orientation, without any risk of product being retained. The two sections (38, 40) can in particular be installed on the same tilting arm (42).

24 Claims, 10 Drawing Sheets

INTERFACE DEVICE FOR THE TRANSFER OF FLUID PRODUCTS BETWEEN TWO CONTAINERS

DESCRIPTION

The invention relates to an interface device for the tight transfer of fluid products such as powders between two containers, It should be noted that throughout the present text the word "container" defines any tight enclosure delimiting a closed volume, no matter what the shape, dimensions and functions (storage, transportation, chemical reaction, etc.) given to said volume.

Such an interface device can be used in numerous industrial fields such as the food and pharmaceutical industries, particularly for ensuring the transfer of powder products between a storage container or a chemical reactor equipped with a hopper and a mobile container used for transferring the product to another location.

FR-A-2 673 990 proposes an interface device comprising a tight chamber having two aligned openings respectively connectable in tight manner to each of the containers. One of the openings is equipped with a door which can be coupled by a bayonet system to a door of a transfer container, in order to form a double door, tight transfer system. Manipulating means placed within the tight chamber make it possible to control, by rotation, the opening and closing of the double door, as well as its retraction or clearing by translation within the tight chamber. At the end of said retraction, a telescopic transfer tube is brought into the alignment of the two openings of the tight chamber. The manipulating means then make it possible to control the elongation of said telescopic transfer tube, so as to tightly link the two containers.

This interface device can be installed on a storage container or a chemical reactor equipped with a hopper, in order to form a lock to which can be tightly connected a mobile container used for transferring the product to another location.

The telescopic nature of the transfer tube leads to the presence of retention zones. Thus, the sections of the telescopic transfer tube necessarily have different internal diameters over at least part of their length. When the fluid product transferred by the interface is a powder, a certain powder quantity can remain blocked in said retention zones. The interface device described in FR-A-2 673 990 can only be used in a single orientation in which the axis of the transfer tube is oriented vertically and in the direction for which powder retention is at a minimum.

The invention mainly relates to an interface device, whose original design enables it to transfer fluid products such as powders in accordance with a random orientation by eliminating retention zones in the transfer tube.

According to the invention this object is achieved by means of an interface device for the transfer of fluid products between two containers, comprising a tight chamber having two aligned openings, a door and a transfer tube formed from at least two sections and placed in said chamber, as well as manipulating means able to displace the door and the transfer tube between an inoperative position, in which the door seals a first of the openings and the transfer tube is retracted in the tight chamber, laterally with respect to the aligned openings, and a transfer position, in which the door is retracted into the chamber, laterally with respect to the aligned openings, and the transfer tube connects the containers in tight manner coaxially to the openings, wherein the two sections of the transfer tube have a substantially uniform and identical internal cross-section and are placed end to end in the transfer position.

Preferably, a first of the sections of the transfer tube is mounted so as to pivot about a first axis orthogonal to the axis of said section and cooperates with the second opening and with the second section by spherical bearing surfaces, advantageously without clearance or play, in the transfer position.

In order to obtain clearance-free, spherical bearing surfaces, at least one of the elements constituted by the first section, the second section and the tight chamber has at least one flexible portion.

According to a first variant, said flexible portion is an annular portion of the tight chamber, connecting a partition of the chamber, in which is formed the second opening, to a tube of the chamber, internally defining said second opening, and means for taking up the clearance or play, acting in the direction of the axis of the openings, being interposed between said partition and said tube.

According to a second variant, the first section cooperates with the second section and with the second opening by means forming cams bringing the spherical bearing surfaces into contact whilst deforming the flexible portion, when the first section enters the transfer position.

According to a third variant, inflating means act on the flexible portion in order to bring the spherical bearing surfaces into contact when the first section occupies the transfer position.

In a first embodiment of the invention, the first section is advantageously installed in pivoting manner on a first mobile support placed within the tight chamber and also carrying the second section.

In this case, the first mobile support can form an arm, mounted so as to tilt in the tight chamber, about a second axis orthogonal to the axis of the aligned openings formed in the tight chamber. The manipulating means then comprise means for controlling a tilting of the arm about the second axis and means for controlling a pivoting of the first section on the arm about the first axis. These latter means act on the first section either through movement transmission means located in the arm, or by means of a sliding poker which traverses the tight chamber and acts on the first section through dog clutch means.

In the first embodiment of the invention, as a variant, the first mobile support can be installed in sliding manner in the tight chamber, in accordance with a third axis parallel to the axis of the aligned openings and pivoting about said third axis.

In a second embodiment of the invention, the first section is mounted so as to pivot on a first mobile support placed within the tight chamber and the second section is carried by a second mobile support also placed within said tight chamber.

Advantageously, the first mobile support is then mounted so as to pivot in the tight chamber about a third axis parallel to the axis of the aligned openings formed in the chamber.

In this case, the second mobile support can either be mounted in tilting manner in the tight chamber about a second axis orthogonal to the axis of the aligned openings, or can be installed in sliding manner in the tight chamber in accordance with a fourth axis parallel to the axis of the aligned openings and pivoting about said fourth axis.

Moreover, the door is fitted on a third mobile support placed within the tight chamber so as to be able to turn about its own axis.

In the first embodiment of the invention, the third mobile support advantageously then forms a second arm, which is mounted in tilting manner about a fifth axis orthogonal Do the axis of the aligned openings formed in the tight chamber.

The manipulating means then comprise means for controlling a tilting of the second arm about the fifth axis and means for controlling a rotation of the door about its own axis.

As a function of the particular case, the means for controlling a rotation of the door can either act on the latter through movement transmission means housed in the second arm, or can have a second sliding poker, which traverses the tight chamber and acts on the door through second dog clutch means.

In the second embodiment of the invention, the third mobile support is mounted so as to pivot in the tight chamber about a sixth axis parallel to the axis of the aligned openings.

The manipulating means then comprise means for controlling a pivoting of the third support about the sixth axis and means for controlling a rotation of the door about its own axis and a translation of the door in accordance with said axis.

According to another aspect of the invention, the manipulating means comprise actuators, which are all placed outside the tight chamber. This arrangement facilitates the maintenance of the actuators and avoids damage thereto by the transferred products.

The invention is described in greater detail hereinafter relative to non-limitative embodiments and the attached drawings, wherein show:

FIG. 1 A vertical sectional view diagrammatically illustrating a preferred embodiment of an interface device according to the invention.

Figure 2:
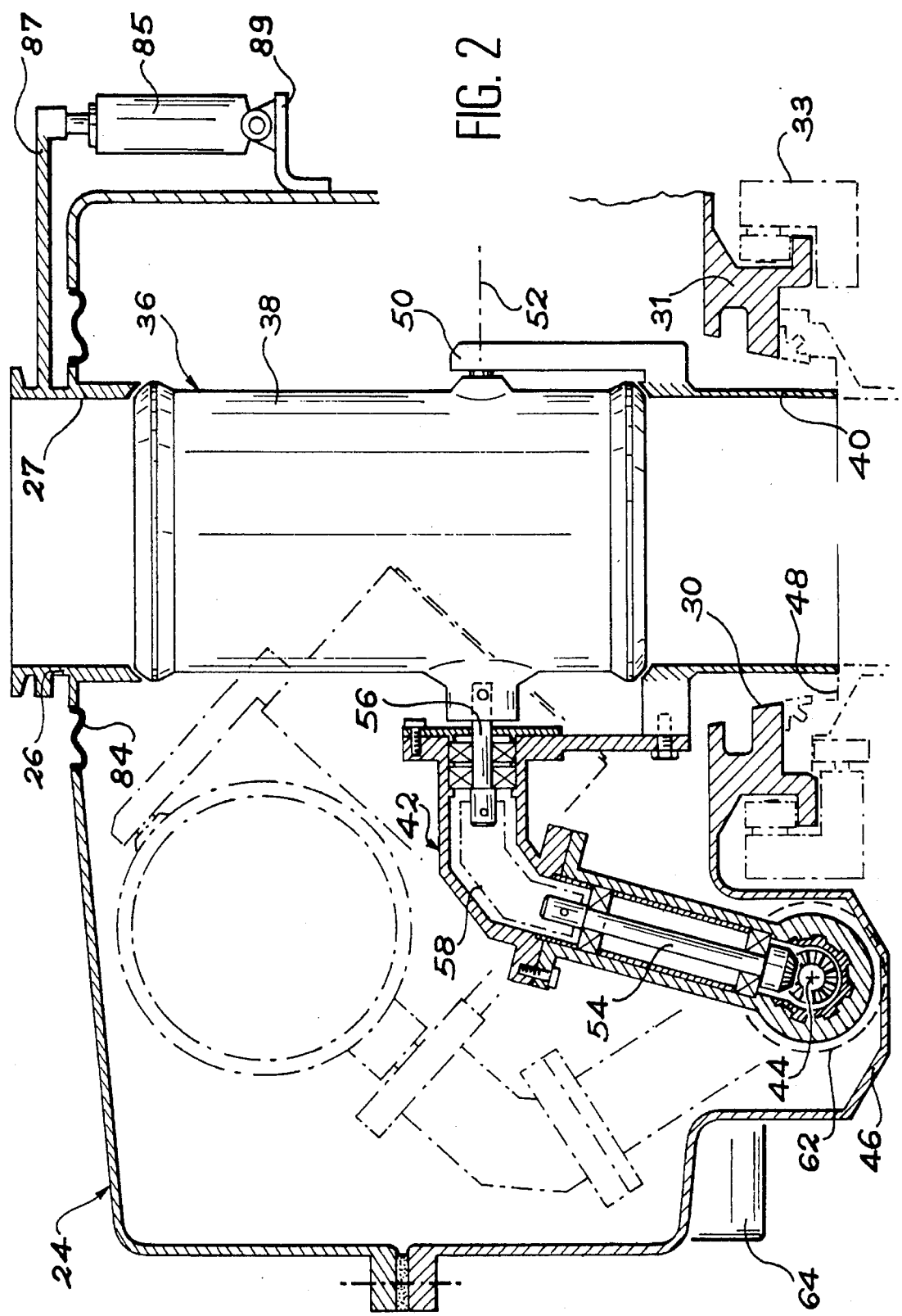

FIG. 2 A vertical sectional view illustrating on a larger scale part of the tight chamber of the interface device and the associated mechanisms used for manipulating the transfer tube, according to the first embodiment of the invention.

Figure 3:
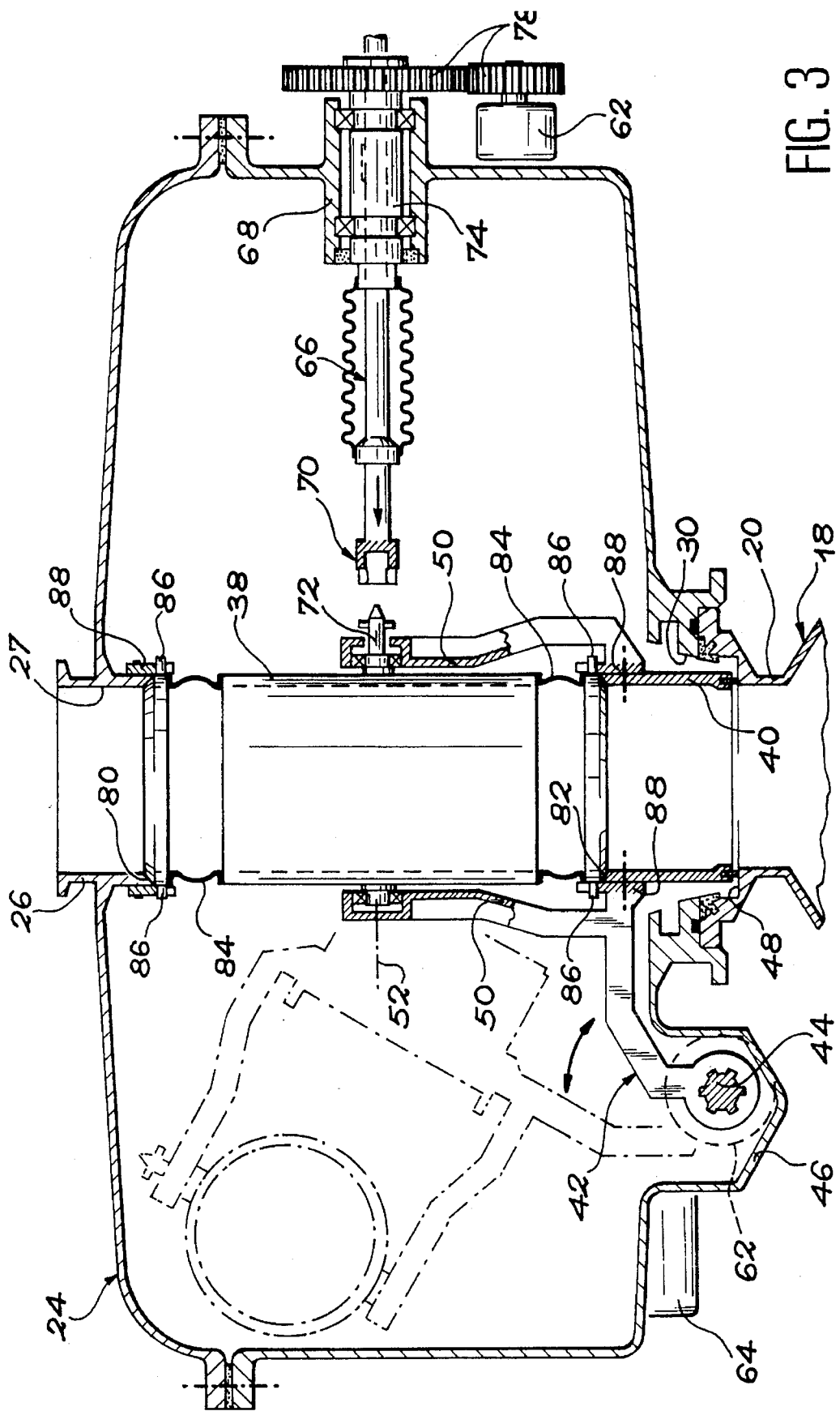

FIG. 3 A sectional view comparable to FIG. 2 illustrating a variant of the mechanism used for controlling the rotation of the first section of the transfer tube.

Figure 4:
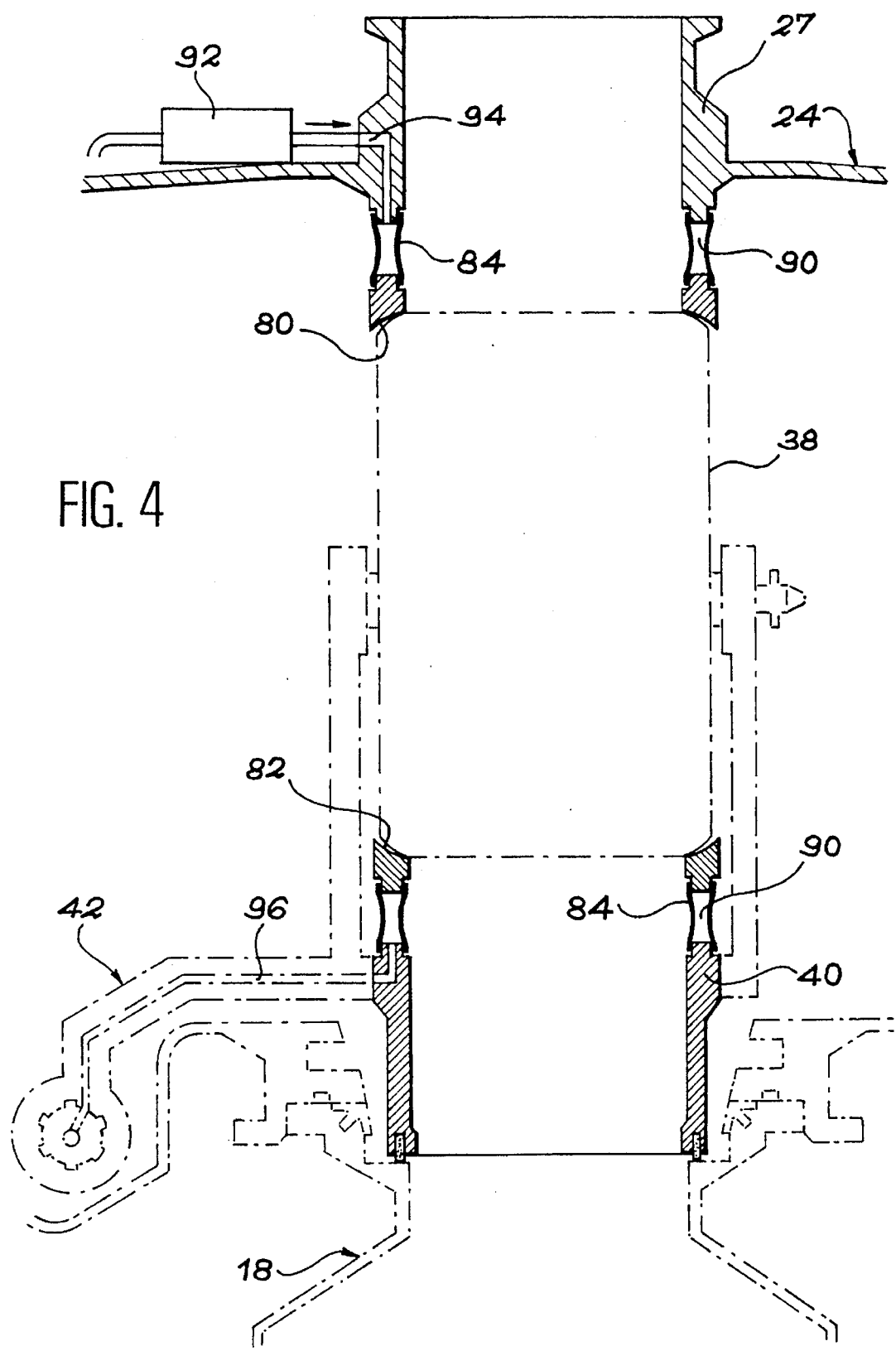

FIG. 4 A view comparable to FIG. 3 illustrating a variant of means making it possible to ensure the tightness of the transfer tube.

Figure 5:
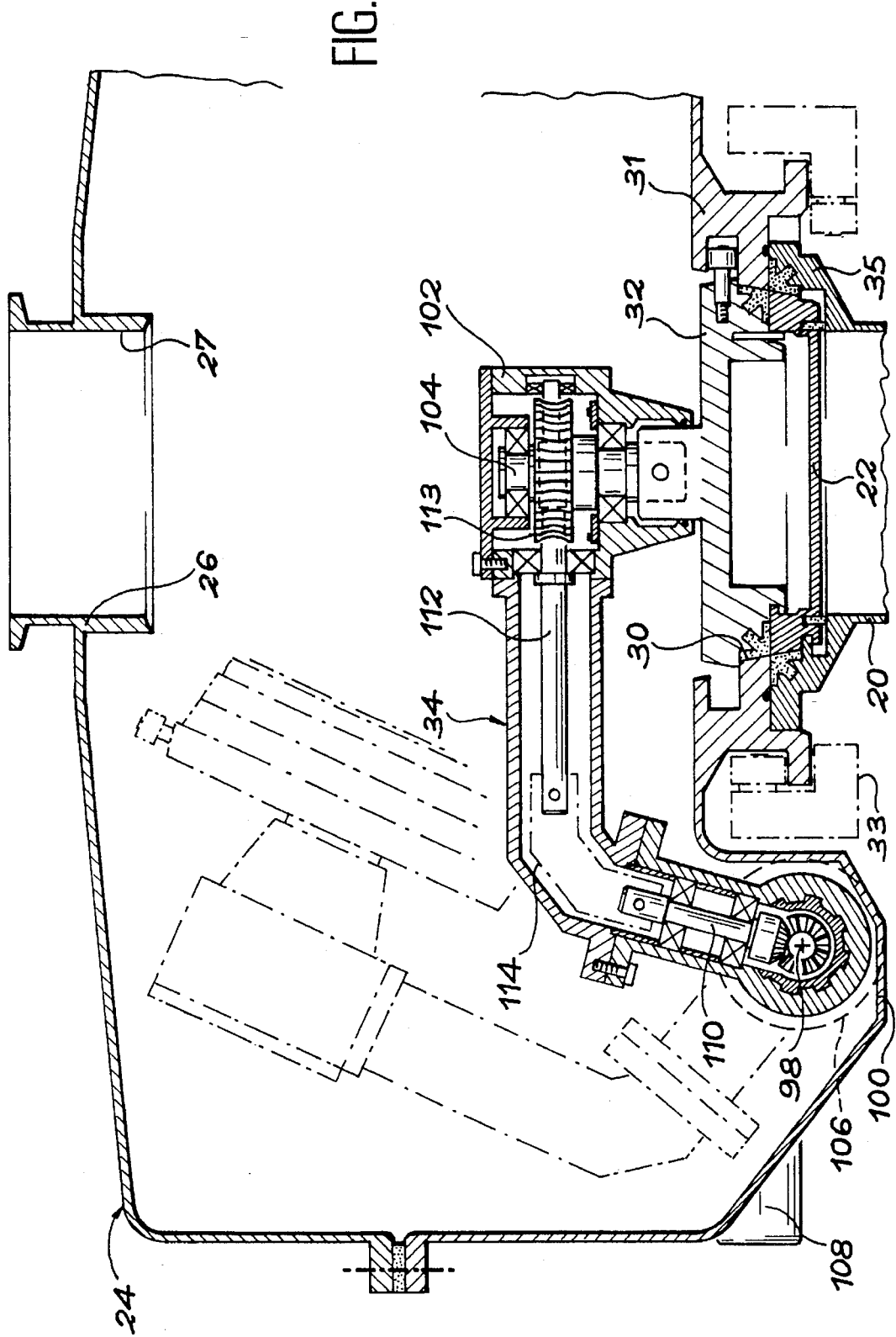

FIG. 5 A sectional view comparable to FIG. 2 illustrating the mechanisms used for manipulating the door in the embodiment of FIG. 2.

Figure 6:
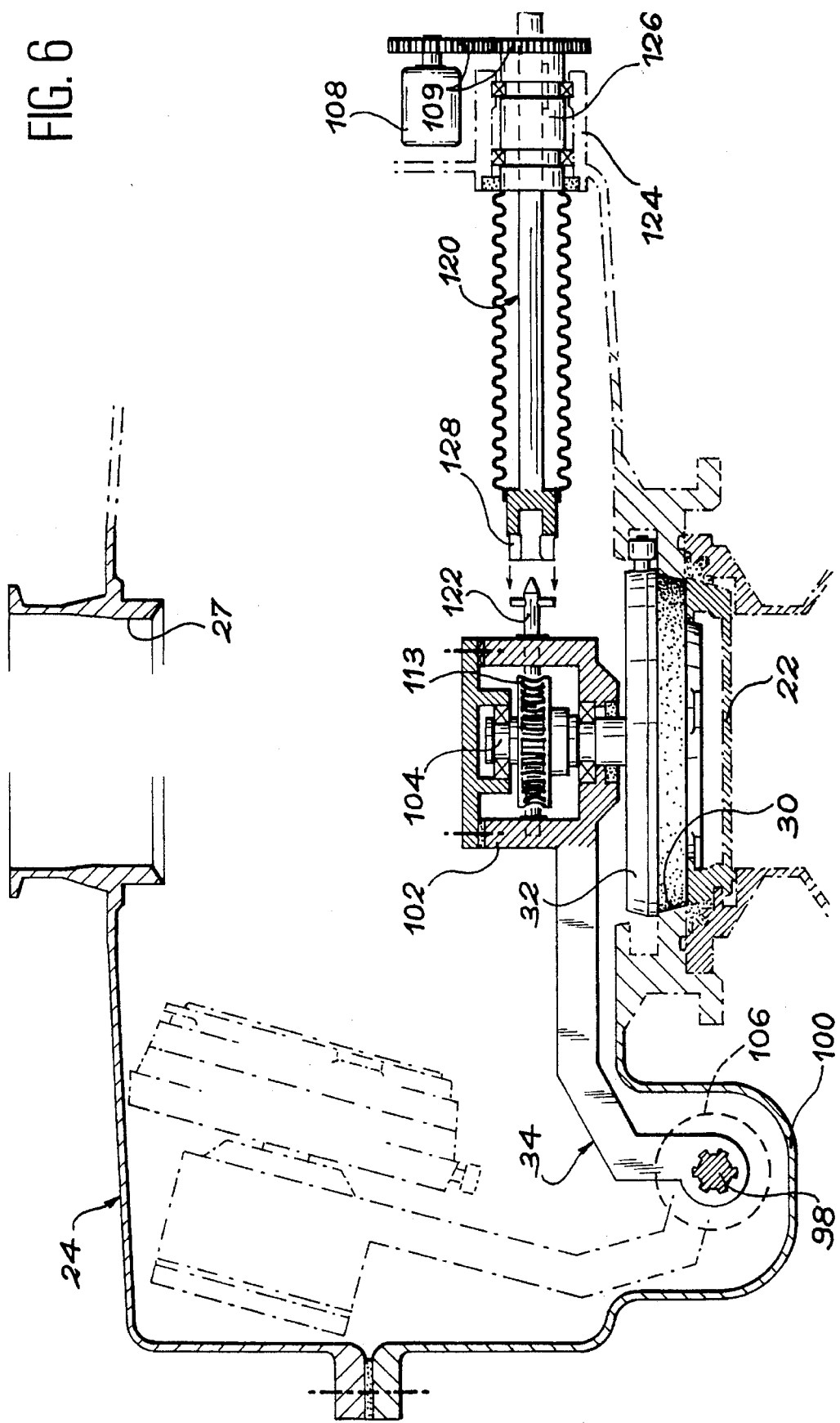

FIG. 6 A view comparable to FIG. 5 illustrating a variant of the mechanism used for controlling the rotation of the door.

Figure 7:
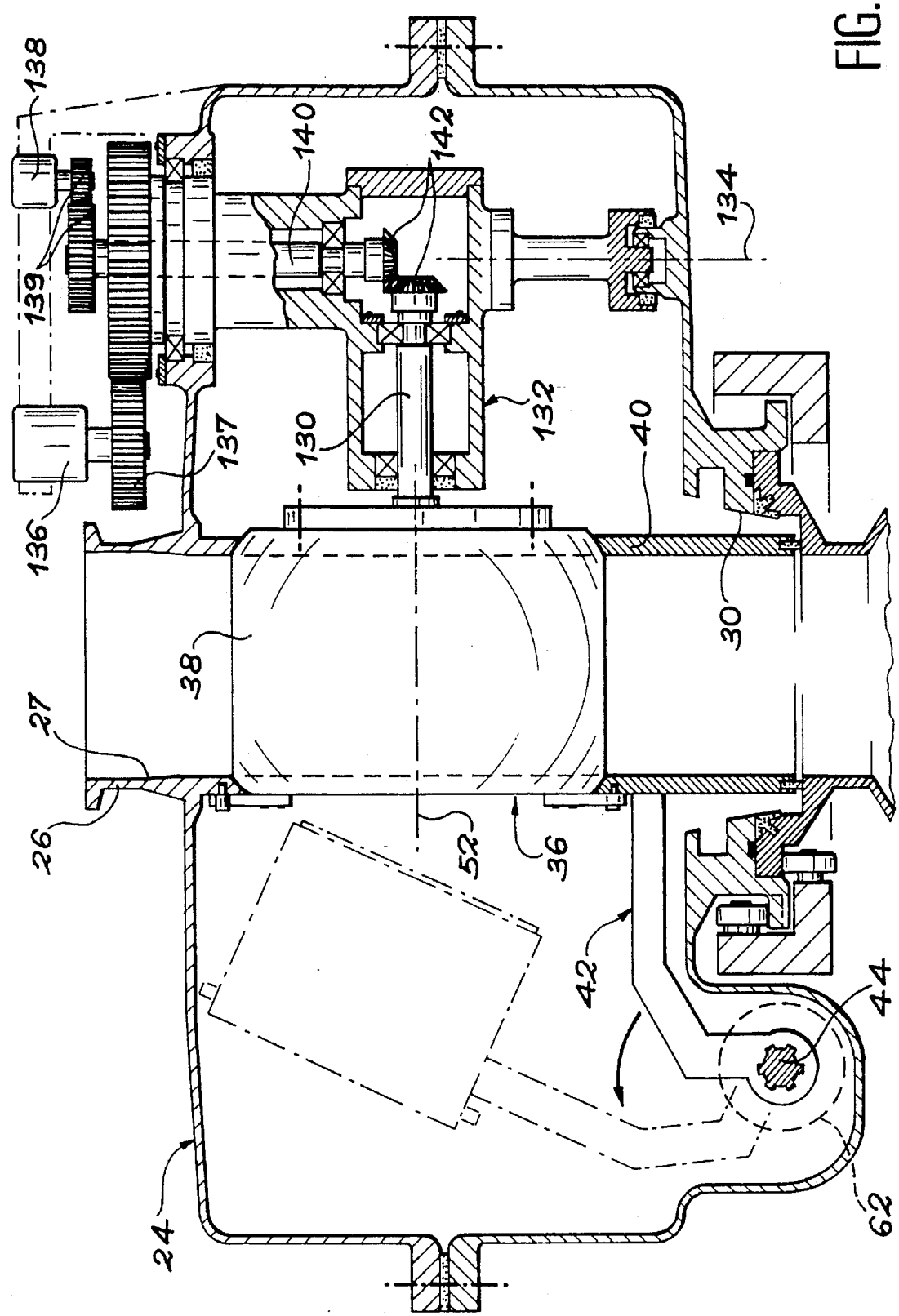

FIG. 7 A sectional view comparable to FIG. 2 illustrating a second embodiment of the invention.

Figure 8:
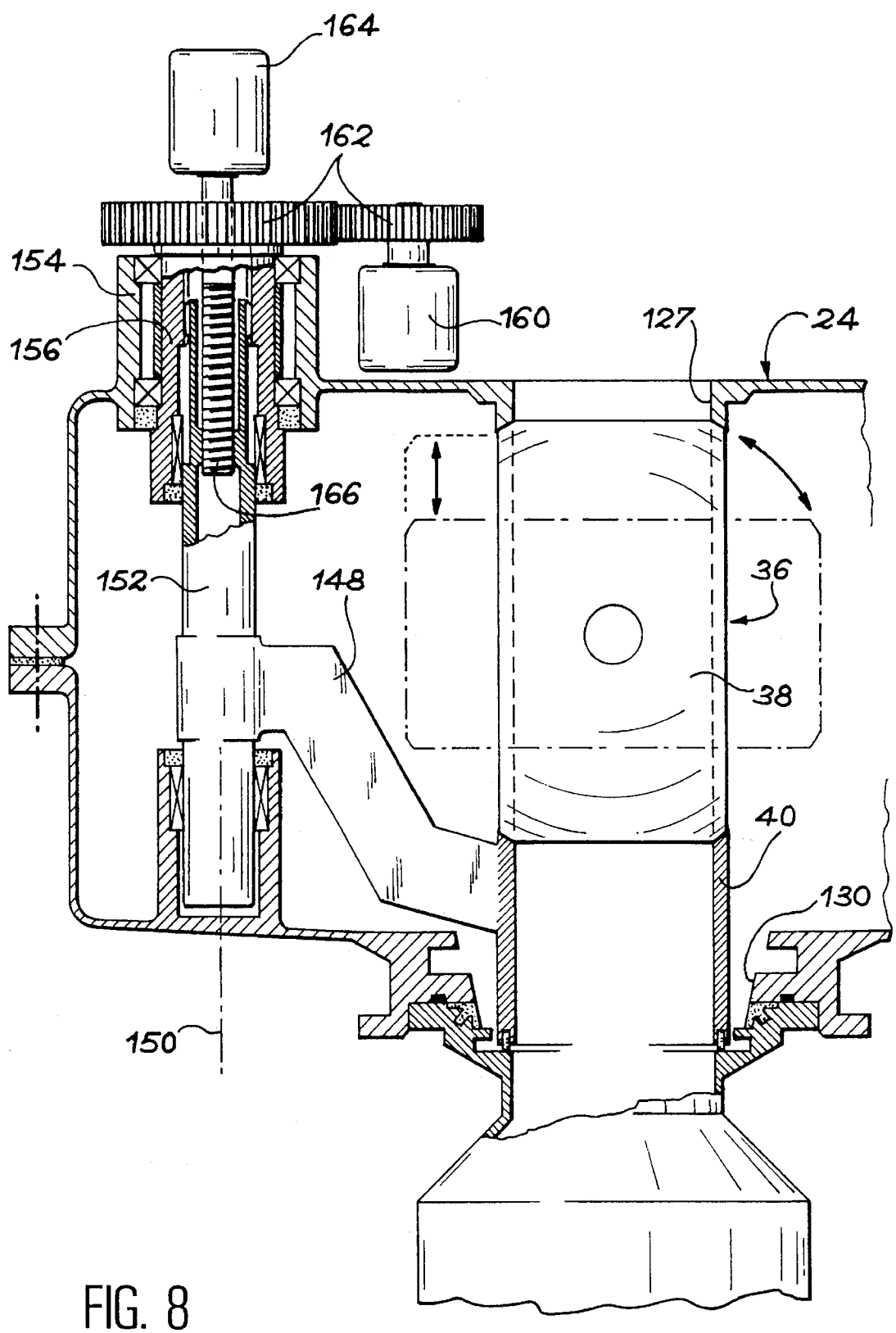

FIG. 8 A sectional view comparable to FIG. 7 illustrating the variant of the second embodiment of the invention.

Figure 9:
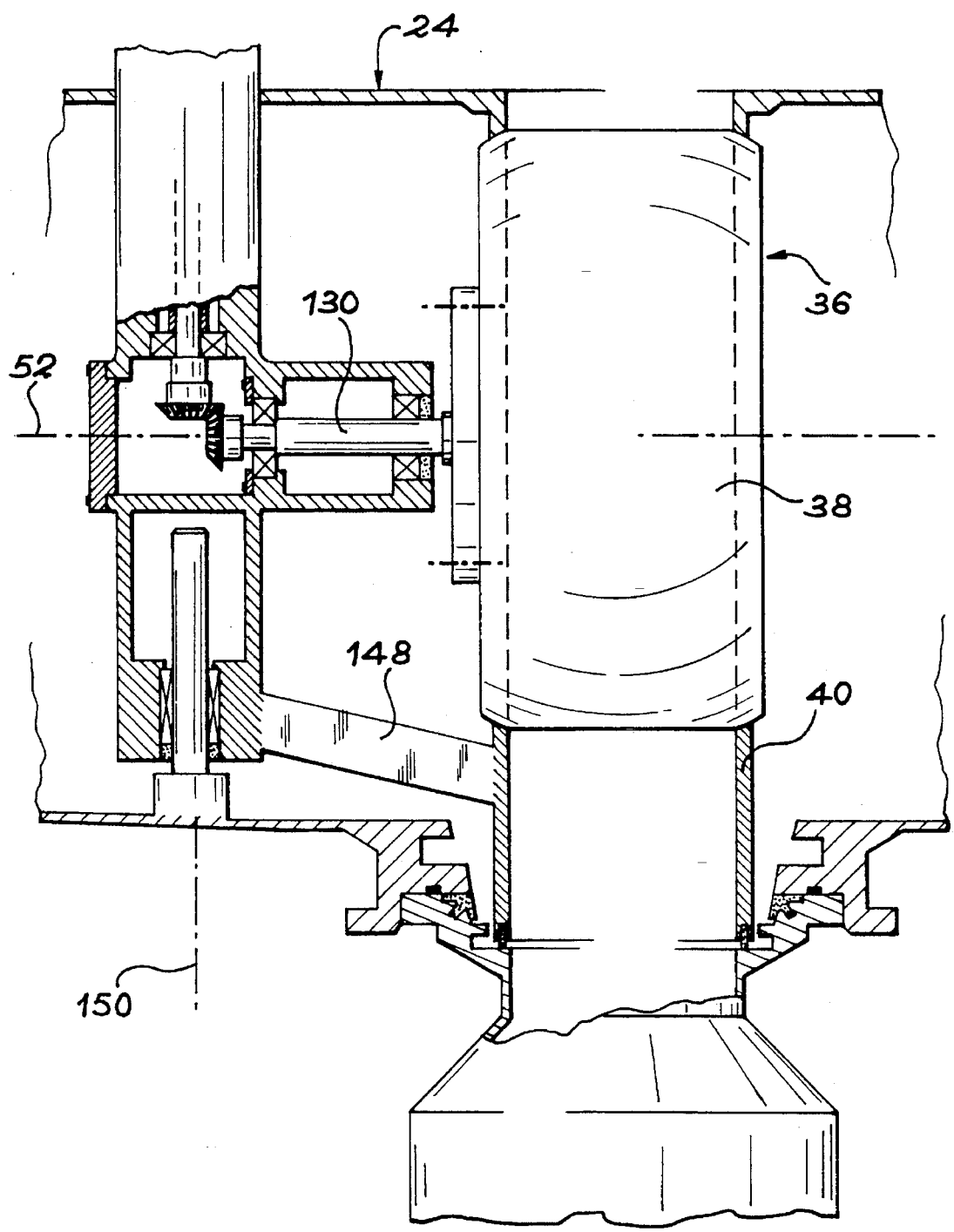

FIG. 9 A sectional view comparable to FIG. 2 illustrating a variant of the first embodiment of the invention.

Figure 10:
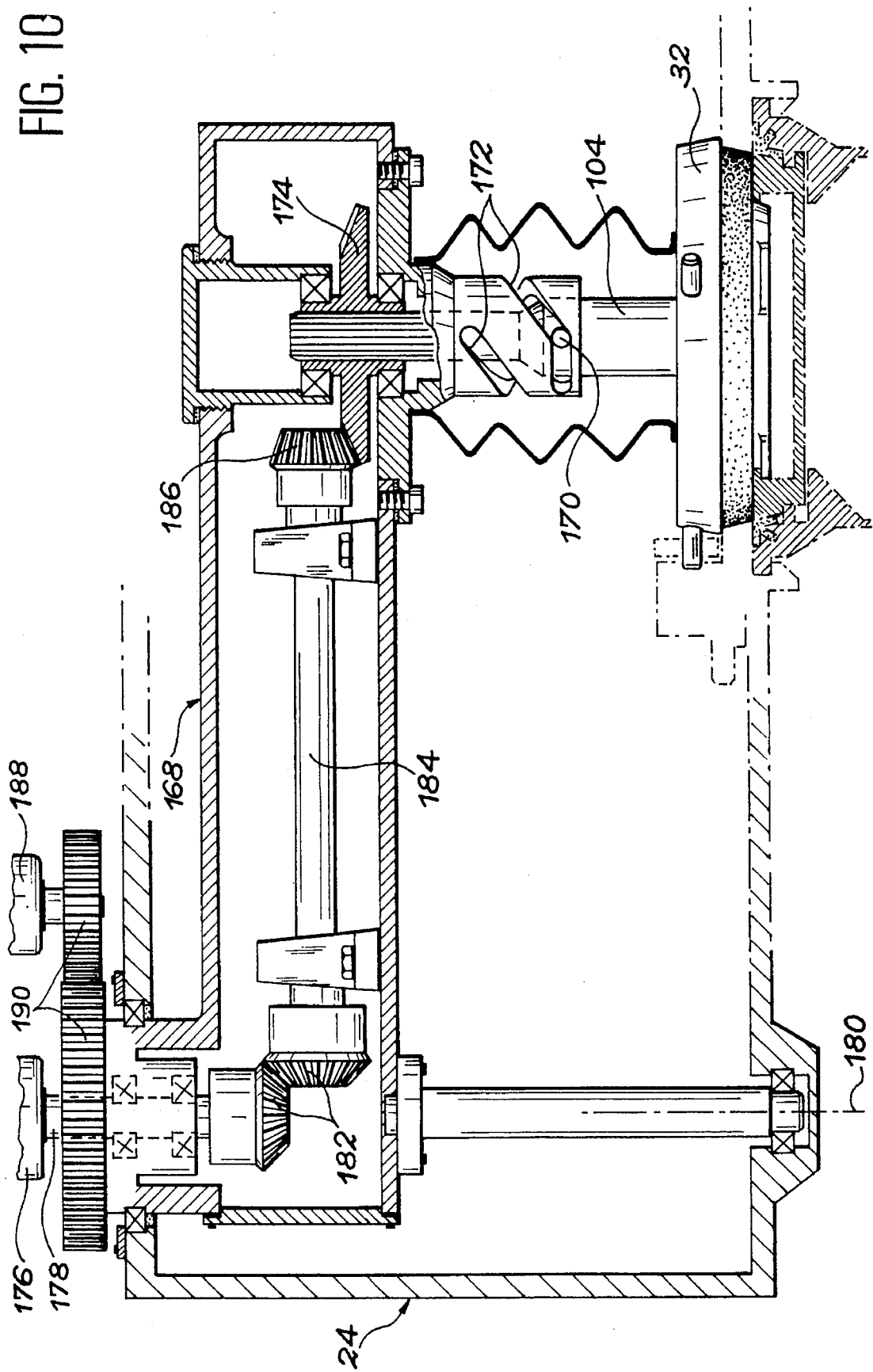

FIG. 10 A sectional view comparable to FIG. 5 illustrating the mechanisms used for manipulating the door in the second embodiment of the invention.

The interface device according to the invention is designed to permit the transfer, as required, of fluid products, such as powders, between two containers.

In the preferred embodiment of the invention diagrammatically illustrated in FIG. 1, the first container is a storage container 10 containing the fluid product P to be transferred. Only the bottom part of the container 10, materialized by a hopper 12, is illustrated in FIG. 1. In its bottom part, the hopper 12 is terminated by a vertical tube 14 internally defining a passage having a uniform circular cross-section. This passage is normally sealed by a trapdoor 16, which can be manipulated manually or with the aid of a not shown actuator.

In the preferred embodiment of the invention according to FIG. 1, the second container is a mobile transfer container 18 permitting the transfer of a certain volume of the fluid product P to another location. This container 18 has a neck 20 internally defining a passage having a uniform circular cross-section, whose diameter is advantageously the same as that of the passage internally defined by the tubular portion 14. A door 22 (FIG. 5) cooperates by means of a bayonet system with the end of the neck 20 in order to tightly seal the container 18.

The interface device according to the invention is intended to be associated with the storage container 10, so as to form a lock between said container and the mobile transfer container 18.

To this end, the interface device according to the invention has a tight chamber 24, whose upper wall is traversed by a tube 26 for tight connection to the tubular portion of the container 10 by the tight fixing means diagrammatically illustrated at 28 in FIG. 1. The tube 26 internally defines an opening 27 having a uniform circular cross-section and whose diameter is equal to the internal diameter of the vertical tube 14. When the tube 26 is connected to the tube 14 by tight fixing means 28, their axes are aligned, so that there is substantially no discontinuity for the passage of the fluid product P.

On its lower wall facing the tube 26, the tight chamber 24 has another circular opening 30 axially aligned with the circular opening 27 defined by the tube 26. This second circular opening 30 is normally sealed by a door 32 (FIG. 5), which cooperates by a bayonet system with the circular opening 30 in order to normally seal it in a tight manner. Manipulating means described in greater detail hereinafter relative to FIG. 5 make it possible to control a rotation of the door 32 about its own axis, in order to ensure its opening and closing, as well as a tilting of an arm 34 (FIG. 3) carrying the door 32 within the tight chamber 24 between an inoperative position in which the sealed door is located in the opening 30 and a transfer position in which the door is laterally retracted with respect to said opening. In FIG. 1 the door 32 is in the latter position, which explains why it is not shown.

The opening 30, normally closed by the door 32, is defined by a flange 31 belonging to the wall of the tight chamber 24. Outside the latter, the flange 31 supports in rotary manner a ring 33. The ring 33 cooperates by a bayonet system with a flange 35 terminating the neck 20 of the mobile transfer container 18, so as to permit the tight connection of the latter to the tight chamber 24.

The flanges 31 and 35, as well as the doors 32 and 22, respectively associated with the tight chamber 24 and the container 18, form a tight, double door transfer system. The door 22 of the container 18 is consequently associated with the door 32 of the chamber 24 when the latter is brought into the transfer position.

As is very diagrammatically illustrated by FIG. 1, the interface device according to the invention also comprises a transfer tube 36 having a circular cross-section, whose internal diameter is substantially uniform and equal to the internal diameter of the tubes 14, 26 and the neck 20.

The transfer tube 36 is formed from two sections 38, 40, which are placed end to end in the extension of the tube 26, in the transfer position illustrated in FIG. 1, in which the transfer tube 36 tightly connects the containers 10 and 18 coaxially to the openings 27 and 30. In this transfer position, the door 32 is retracted into the tight chamber 24, as indicated hereinbefore.

The transfer tube 36 can also occupy an inoperative position, in which it is retracted within the tight chamber 24. In this inoperative position, the door 32 seals the opening 30, as illustrated in FIG. 5. The displacement of the door 32 and the transfer tube 36 between the inoperative position and the transfer position is brought about by manipulating means which can be in different forms.

In the embodiment illustrated in FIGS. 1 to 4, the two sections 38 and 40 of the transfer tube 36 are installed on the same mobile support formed by an arm 42. This arm 42 is fitted in tilting manner in the tight chamber 24, about an axis 44 orthogonal to the axis of the aligned openings 27 and 30.

As is more specifically illustrated by FIG. 2, the axis 44 traverses a bulge 46 formed in the lower wall of the tight chamber 24 having the opening 30. The arm 42 is articulated to the axis 44 by one of its ends and has a bent shape. The section 40 of the transfer tube 36 is fixed to the opposite end of the arm 42, in such a way that the axis of said section 40 is orthogonal to the axis 44 and is placed in the alignment of the axis common to the openings 27 and 30 in the aforementioned transfer position.

In this position, illustrated in continuous line form in FIG. 2, a lower end face of the section 40 bears against a shoulder 48 formed on the flange 35 of the container 18, which is then docked on the tight chamber 24. The sealing is advantageously ensured by a joint mounted on the aforementioned end face of the section 40 of the transfer tube 36, or more simply by a metal-metal contact.

The end of the arm 42 to which is fixed the section 40 of the transfer tube has a cover 50 in which is pivotably mounted the section 38 of the transfer tube. This cover 50 defines a pivoting axis 52 perpendicular to the axis of the section 40 and orthogonal to the tilting axis 44, in the embodiment illustrated in FIG. 2. In the transfer position in which the end of the section 40 bears on the shoulder 48, the axis 52 is perpendicular to the axis common to the openings 27 and 30. Moreover, the length of the section 38 of the transfer tube 36 is substantially equal to the distance then separating the facing ends of the tube 27 and the section 40.

In the transfer position, the transfer tube section 38 is located coaxially to the section 40, as well as the opening 27 and the neck 20. In view of the fact that the internal diameters of these different elements are substantially uniform and identical, there is then no retention zone between the containers 10 and 18. Thus, the transfer of the fluid product P can take place without any risk of part thereof being blocked in the interface device. This observation is valid no matter what the orientation of the common axis to the two openings 27 and 30 and the two sections 38 and 40 of the transfer tube. Thus, this permits both a transfer by gravity, in the case where said axis is vertical, and a transfer with the aid of a thrust system placed in the container 10, when said axis is differently oriented.

In order to permit the tilting of the arm 42 towards its inoperative position, illustrated in mixed line form in FIG. 2, a pivoting of the section 38 of the transfer tube substantially by 90° about its pivoting axis 52 must be performed.

In the embodiment illustrated in FIG. 2, said pivoting is controlled through movement transmission means located within the arm 42. These movement transmission means are constituted by conventional mechanisms more particularly comprising shafts 54, 56 cooperating with one another by a flexible or cardan-type transmission 58. An actuator 62, located outside the tight chamber 24, controls the pivoting of the section 38 via the aforementioned movement transmission means.

The tilting movement of the arm 42 about the tilting axis 44 is also controlled by manipulating means constituted by an actuator 64 located outside the tight chamber 24.

FIG. 3 shows a variant of FIG. 2 only differing from the latter by the mechanism making it possible to control the pivoting of the section 38 of the transfer tube 36 about its pivoting axis 52.

In this variant, the movement transmission means placed in the arm 42 are replaced by a sliding poker 66, mounted so as to rotate and slide in a tube 68 traversing the wall of the tight chamber 24 along the axis 52. The end of the sliding poker 66 placed within the tight chamber 24 is able to cooperate, with dog clutch means 70, with the end of a journal 72 positioned along the axis 52 and locked with the transfer tube section 38.

A sleeve 74 is supported in rotary manner by the tube 68 and traversed by the sliding poker 66, so that it is linked in rotation with the latter, e.g. by a key system.

The manipulating means comprise in this case an actuator 62 located outside the tight chamber 24 so as to be able to rotate the sleeve 74 about its axis by means of a set of gears 78. Another, not shown actuator permits the axial displacement of the sliding poker 66 between its clutching position and its declutching position, e.g. via a screw-nut type mechanism. The latter actuator is also located outside the chamber 24.

In the embodiments illustrated in FIGS. 2 and 3, the bringing of the section 38 of the transfer tube 36 into the alignment of the openings 37 and 30 is accompanied by the clearance-free bearing of the spherical bearing surfaces 80, 82, in each case formed by the ends of said section 38, against complimentary, spherical bearing surfaces formed on the adjacent end of the tube 26 and on the adjacent end of the section 40.

In the variant illustrated in FIG. 2, the tight chamber 24 has a flexible or deformable, annular portion 84 connecting the tube 26 to the partition of the chamber supporting said tube. Moreover, a not shown, flexible coupling is interposed, within the tight chamber 24, between the actuator 64 and the arm 42. A flexible system such as a not shown O-ring is also inserted between the shaft 56 positioned along the axis 52 and the arm 42.

In this variant of FIG. 2, there is normally a slight clearance or play (e.g. 0.5 mm) between the section 38 and the tube 26 and between the sections 38 and 40. Moreover, the section 40 is advantageously in direct metal-metal bearing on the shoulder 48 of the flange 35 of the container 18.

The taking up of the plays or clearances is ensured by means such as at least two jacks 85, whose axes are oriented parallel to the common axis of the openings 27 and 30. These jacks bear on the one hand on the tube 26 by rigid arms 87 and on the other on the partition of the tight chamber 24 by brackets 89. The actuation of the jacks 85 has the effect of taking up the clearances between the tube 26, the section 38, the section 40 and the flange 35, as a result of the deformations of the flexible, annular portion 44, the actuator 64-arm 42 flexible coupling and the O-ring surrounding the shaft 56.

The jacks 85, located outside the chamber 24, are advantageously placed in a plane orthogonal to that of FIG. 2. One of them has been brought into the latter plane in order to facilitate understanding.

In the variant of FIG. 3, the section 38 of the transfer tube 36 has, in the vicinity of each of its ends, a flexible or deformable portion 84 allowing a slight variation of length of said section 38 without bringing about any significance variation in its internal diameter. The flexible portions 84 can in particular be formed by reduced thickness, tubular portions having a very flattened wave-like cross-section. In the inoperative state, the flexible portions 84 ensure the existence of a functional clearance facilitating the pivoting of the section 38 about the axis 52.

The terminal portions of the section 38 intended to come into contact respectively with the tube 26 and the section 40 by the spherical bearing surfaces 80 and 82 have on their periphery fingers 86 radially oriented towards the outside, parallel to the pivoting axis 52 of the section 38. When the section 38 pivots from its retracted position permitting the tilting of the arm 42 into its alignment position with the tube 27 and the section 40, the fingers 86 bear on means forming a cam. In this variant, the cam-forming means comprise guidance ramps formed on hooks 88 respectively fixed to adjacent ends of the tube 27 and the section 40.

The cooperation of the fingers 86 with the ramps formed on the hooks 88 has the effect of slightly lengthening the section 38 of the transfer tube, whilst deforming the flexible portions 84. Thus, a clearance-free contact is brought about level with the spherical bearing surfaces 80, 82 when the section 38 arrives in the alignment of the tube 27 and the section 40.

It should be noted that as a variant, the flexible portions 84 could be replaced by a single flexible portion. Moreover, the flexible portion or portions can be placed beyond the section 38 and in particular on the section 40, as well as on the tight chamber 24, particularly on the tube 26 or on the wall supporting it.

In another variant of the first embodiment of the invention illustrated in FIG. 4, the elimination of the clearance at the spherical bearing surfaces 80 and 82 is still obtained by a deformation of the flexible portions 84. However, instead of being ensured by cam-forming means 86, 88, said deformation is controlled by inflating means 92 acting on the flexible portions 84.

More specifically, in the case of FIG. 4, the flexible portions 84 are formed on the tube 27 and on the section 40, in the vicinity of the spherical bearing surfaces 80 and 82. Each of the flexible portions 84 is then surrounded by an annular chamber 90 connected to the inflating means 92, the latter being placed outside the tight chamber 24. The inflating means 92 communicate with the annular chamber 90 formed in the tube 27 by a first passage 94 passing into the said tube and with the annular chamber 90 formed in said transfer tube section 40 by a second passage 96 passing into the tilting arm 42.

As in the case where the clearance-free contact of the spherical bearing surfaces 80 and 82 is assured by cam-forming means, the flexible portions 84 can be provided either on the section 38, or on the tight chamber 24 (i.e. particularly on the tube 27 or on the wall supporting it) and/or on the section 40.

In the first embodiment of the invention, the manipulating means permitting the displacement of the door 32 from its inoperative position in which it seals the opening 30 into its transfer position in which it is retracted into the chamber 24, preferably act on the door 32 by the tilting arm 34, in such a way as will be described relative to FIG. 5.

The arm 34 is mounted so as to tilt within the tight chamber 24 about an axis 98 orthogonal to the axis common to the openings 27 and 30. This axis 98 is essentially located in the same plane perpendicular to the axis common to the openings 27 and 30 as the tilting axis 44 of the arm 42. It traverses a protuberance 100 of the wall of the chamber 24 incorporating the opening 30. This protuberance 100 is located at a position angularly displaced with respect to the protuberance 46 traversed by the axis 44, about the axis common to the openings 27 and 30. This arrangement makes it possible to avoid any interference between the arms 42 and 34 and the structures supporting it, during their respective tilting movements.

The arm 34 has a bent shape and is articulated to the axis 98 at one of its ends. Its opposite end carries a box 102 in which it supports in rotary manner a journal 104 integral with the door 32. The arm 34 has a configuration such that the axis common to the door 32 and to the journal 104 coincides with the axis common to the openings 27 and 30, when the door 32 is received in the opening 30.

A first actuator 106 located outside the tight chamber 24 acts on the arm 34 so as to control its tilting about the axis 98 between the inoperative position and the transfer position defined hereinbefore.

Due to the fact that the door 32 cooperates with the opening 30 by a bayonet system, the opening and closing of the door are assured by a rotating thereof in one or other direction. Another bayonet system is provided between the door 32 of the tight chamber 24 and the door 22 of the transfer container 18. The rotation of the door 32 in its opening direction consequently has the effect of locking the container door 22, whereas the rotation of the door 32 in its closing direction has the effect of unlocking the door 22 from the container.

In the embodiment illustrated in FIG. 5, the manipulation of the door 32 is assured by an actuator 108 located outside the tight chamber 24 by movement transmission means located in the arm 34. Within the arm 34, these means e.g. comprise rotary shafts 110 and 112, whose ends cooperate by a flexible transmission 114. The shaft penetrating the box 102 has a not shown worm, which cooperates with a gear wheel 113 carried by the journal 104.

A variant of the mechanism permitting the control of the rotation of the door 32 and which will now be described relative to FIG. 6, is to be likened to the variant described hereinbefore relative to FIG. 3.

Thus, instead of having movement transmission means located in the arm 34, said mechanism now has a sliding poker 120, which traverses the wall of the tight chamber 24 in a direction orthogonal to the axis common to the openings 27 and 30. More specifically, the sliding poker 120 is aligned with a shaft 122, supported in rotary manner by the box 102, when the arm 34 occupies its inoperative position corresponding to the closing of the door 32. The shaft 122 is mounted so as to rotate in the box 102 in a direction orthogonal to the axis of the journal 104 and it has a not shown endless screw meshed on a toothed wheel 113 integral with the journal 104. Thus, the rotation of the shaft 122 has the effect of rotating the door 32 about its axis.

The sliding poker 120 is installed in the partition of the tight chamber 24 by a tube 124 belonging to the latter. More precisely, the tube 124 supports in rotary manner a sleeve 126 slidingly traversed by the poker 120. A key system permits the linking in rotation of the sleeve 126 and the poker 120.

At its end located within the tight chamber 24, the sliding poker 120 has dog clutch means 128 able to engage on the end of the shaft 122 when the poker is displaced towards the end of the tight chamber.

In this case, the manipulation of the plug 32 is controlled by an actuator 108 located outside the tight chamber 24 and cooperating with the sleeve 126 by a set of pinions 109 so as to ensure the rotation thereof.

A second, not shown actuator permits the displacement of the sliding poker 120 between its active position, in which the poker is integral in rotation with the shaft 122 as a result of the dog clutch means 128 and its retracted position, by means of a mechanism such as a pinion-worm system.

With reference to FIG. 7, a second embodiment of the invention will now be described differing from the first by the means permitting the control of the displacement of the section 38 of the transfer tube 36 from its inoperative position, in which it is retracted within the tight chamber 24, into its transfer position, where it is aligned with the openings 27, 30 and with the section 40.

In this second embodiment of the invention, the section 40 of the transfer tube 36 is mounted, as hereinbefore, at the end of a tilting arm 42, whose pivoting can be controlled from the outside of the tight chamber 24 by an actuator 62.

However, instead of being also supported by the tilting arm 42, the section 38 of the transfer tube 36 is completely independent of the arm 42. Thus, the pivoting axis 52 of the section 38 is in this case materialized by a shaft 130 mounted so as to pivot in a mobile support 132 placed in the tight chamber 24 at a position which is angularly displaced about the axis common to the openings 27 and 30 with respect to the tilting arm 42. More specifically, this mobile support 132 is mounted so as to pivot in the tight chamber 24 about a pivoting axis 134 parallel to the axis of the aligned openings 27 and 30. The control of the pivoting of the support 132 about the axis 134, permitting the retraction of the section 38 within the tight chamber 24, is ensured by an actuator 136 positioned outside the chamber 24. This actuator 136 acts on the support 132 by a set of pinions 137. To this end, the support 132 traverses one of the walls of the tight chamber 24.

The control of the pivoting of the section 38 about its axis 52 is ensured by another actuator 138 located outside the tight chamber 24. This actuator acts on the shaft 130 by movement transmission means partly located in the support 132. These movement transmission means e.g. comprise a set of pinions 139, a shaft 140 and ring and pinion gearings 142.

Although they are mounted on different mobile supports, the sections 38 and 40 cooperate with one another and with the tube 26 by spherical bearing surfaces, as in the case of the first embodiment, when they are aligned. Contacts between the spherical bearing surfaces are then brought about in the manner described relative to FIGS. 2 and 4.

FIG. 8 illustrates a variant of the second embodiment of the invention in which the sections 38 and 40 of the transfer tube tube 36 are also mounted on different mobile supports.

More specifically, the fitting of the mobile support 38 is identical to that described relative to FIG. 7, so that it will not be described again. However, instead of being fitted to a tilting arm, the transfer tube section 40 is fitted to an arm-like support 148, located in the tight chamber 24, so as to be pivotable about an axis 150 parallel to the axis common to the openings 127, 130 and can slide along said axis.

Therefore the end of the support 148 opposite to the section 40 is in the form of a journal 152, which traverses a tube 154 connected to the partition of the tight chamber 24. More specifically, the tube 154 supports in rotary manner a sleeve 156 in which can slide the journal 152. However, a key system links in rotation the journal 152 to the sleeve 156.

An actuator 160 located outside the tight chamber 24 acts on the sleeve 156 by a set of pinions 162, so as to control the pivoting of the arm-like support 148 about the axis 150. Another actuator 162, also located outside the tight chamber 24, rotates a threaded rod 166, which axially penetrates a recessed end portion of the journal 152, located in the sleeve 156. The threaded rod 166 cooperates with a tap formed within the journal 152, so that the actuator 164 controls the rotation of the support 148 along the axis 150.

In this embodiment of the invention, the retraction of the section 40 of the connecting tubes 36 takes place as in FIG. 7 following the retraction of the section 36. However, the tilting movement of the arm carrying the section 40 is replaced by a sliding movement of the arm-like support 148, followed by a pivoting movement of the latter about the axis 150. The extent of the sliding movement is determined in such a way that the section 40 can pivot about the axis 150 within the chamber 24.

FIG. 9 illustrates a variant of the first embodiment of the invention derived from the embodiment of FIG. 8, in which all the mechanisms making it possible to control the translation and rotation displacements of the section 40 are identical to FIG. 8 or are replaced by technically equivalent means. This variant differs from that of FIG. 8 by the fact that instead of being installed on a different support, the section 38 is installed on the support 148 carrying the section 40. In this case, the shaft 130 materializing the pivoting axis 52 of the section 38 is fitted in pivoting manner in the support 148, so that the not shown actuator used for controlling the pivoting of the support 148 about the axis 150 also fulfils the function of the actuator 136 in FIG. 7. Another, not shown actuator, comparable to the actuator 138 in FIG. 7, then controls the pivoting of the section 38 about its pivoting axis 52, by movement transmission means identical to those described relative to FIG. 7.

In the embodiment described hereinbefore relative to FIG. 8 and in the variant of FIG. 9, the manipulations for rotating and retracting the door 32 are assured by mechanisms which will now be described relative to FIG. 10.

In this case, instead of being mounted on a tilting arm as in the embodiment described relative to FIGS. 5 and 6, the door 32 is mounted on a pivoting support 168 installed within the tight chamber 24. The support 168 is shaped like a hollow arm, whereof one end is mounted in pivoting manner on the wall of the chamber 24 and whereof the opposite end supports the door 32. More specifically, the door 32 is integral with a journal 104 carrying fingers 170 oriented radially outwards. These fingers 170 are received in grooves 172 formed in a tubular portion of the support 168 traversed by the journal 104. This arrangement has the effect of a rotation of the door 32 being accompanied by a control translation movement of said door in accordance with its axis.

Within the support 168, the end of the journal 104 is slidingly received in a pinion 174. A key system locks in rotation the pinion 174 and the journal 104.

This arrangement enables an actuator 176 located outside the tight chamber 24 to simultaneously control the rotary movements of the door 32 necessary for its opening and closing, as well as the translatory movements of said door necessary for its retraction. The actuator 176 acts on the pinion 174 by means of movement transmission means located in the support 168. In the represented embodiment, these movement transmission means comprise a shaft 178 located in the pivoting axis 180 of the support 168, ring and pinion gearings 182, a second shaft 184 and a pinion 186 engaged on the pinion 174 within the support 168.

It should be noted that the form given to the grooves 172 makes it possible, during an operation of the actuator 176, to successively rotate the door 32 and then retract it towards the interior of the chamber 24.

The pivoting of the support 168 about its pivoting axis 180 can then be controlled by a second actuator 188, also placed outside the tight chamber 24 and which acts directly on the support 168 by a set of pinions 190.

Obviously, the different embodiments described and their variants can be combined without passing outside the scope of the invention.

I claim:

1. Interface device of the transfer of fluid products between two containers, comprising a tight chamber having two aligned openings, a door and a transfer tube formed from at least two sections and placed in said chamber, as well as manipulating means able to displace the door and the transfer tube between an inoperative position, in which the door seals a first of the openings and the transfer tube is retracted in the tight chamber, laterally with respect to the aligned openings, and a transfer position, in which the door is retracted into the chamber, laterally with respect to the aligned openings, and the transfer tube connects the containers in tight manner coaxially to the openings, wherein the two sections of the transfer tube have a substantially uniform and identical internal cross-section and are placed end to end in the transfer position.

2. Device according to claim 1, wherein a first of the transfer tube sections is mounted so as to pivot about a first axis orthogonal to the axis of said section and cooperates with the second opening and with the second section by spherical bearing surfaces in the transfer position.

3. Device according to claim 2, wherein the spherical bearing surfaces are clearance-free bearing surfaces.

4. Device according to claim 2, wherein the tight chamber has a flexible, annular portion connecting a partition of the chamber, in which is formed the second opening, to a tube of the chamber, internally defining said second opening, means for taking up clearances, acting in the direction of the axis of the openings, being interposed between said partition and said tube.

5. Device according to claim 2, wherein at least one of the elements constituted by the first section, the second section and the tight chamber have at least one flexible portion, the first section cooperating with the second section and with the second opening by cam-forming means, which bring the spherical bearing surfaces into contact whilst deforming the flexible portion, when the first section arrives in the transfer position.

6. Device according to claim 2, wherein at least one of the elements constituted by the first section, the second section and the tight chamber has at least one flexible portion, inflating means acting on said flexible portion in order to bring the spherical bearing surfaces into contact when the first section occupies the transfer position.

7. Device according to claim 2, wherein the first section is mounted so as to pivot on a first mobile support located within the tight chamber and also carrying the second section.

8. Device according to claim 7, wherein the first mobile support forms an arm, mounted in tilting manner in the tight chamber about a second axis orthogonal to the axis of said aligned openings.

9. Device according to claim 8, wherein the manipulating means comprise means for controlling a tilting of the arm about the second axis and means for controlling a pivoting of the first section on the arm about the first axis.

10. Device according to claim 9, wherein the means for controlling a pivoting of the first section on the arm act on said first section through movement transmission means located in the arm.

11. Device according to claim 9, wherein the means for controlling a pivoting of the first section on the arm comprise a sliding poker, which traverses the tight chamber and acts on the first section through dog clutch means.

12. Device according to claim 7, wherein the first mobile support is mounted in sliding manner in the tight chamber, in accordance with a third axis parallel to the axis of the aligned openings, and pivoting about said third axis.

13. Device according to claim 12, wherein the door is mounted on a third mobile support within the tight chamber so as to be able to pivot about its own axis.

14. Device according to claim 13, wherein the third mobile support forms a second arm mounted so as to tilt about a fifth axis orthogonal to the axis of the aligned openings.

15. Device according to claim 14, wherein the manipulating means comprise means for controlling a tilting of the second arm about the fifth axis and means for controlling a rotation of the door about its own axis.

16. Device according to claim 15, wherein the means for controlling a rotation of the door act on the latter through movement transmission means housed in the second arm.

17. Device according to claim 15, wherein the means for controlling a rotation of the door comprise a second sliding poker traversing the tight chamber and acting on the door through second dog clutch means.

18. Device according to claim 13, wherein the third mobile support is mounted in pivoting manner in the tight chamber about a sixth axis parallel to the axis of the aligned openings.

19. Device according to claim 18, wherein the manipulating means comprise means for controlling a pivoting of the third mobile support, a rotation of the door about its own axis and a translation of the door in accordance with said axis.

20. Device according to claim 2, wherein the first section is mounted so as to pivot on a first mobile support located within the tight chamber, the second section being carried by a second mobile support placed within the tight chamber.

21. Device according to claim 20, wherein the first mobile support is mounted in pivoting manner in the tight chamber about a third axis parallel to the axis of the aligned openings.

22. Device according to claim 21, wherein the second mobile support is mounted so as to tilt in the tight chamber about a second axis orthogonal to the axis of the aligned openings.

23. Device according to claim 21, wherein the second mobile support is mounted in sliding manner in the tight chamber according to a fourth axis parallel to the axis of the aligned openings and pivoting about said fourth axis.

24. Device according to claim 1, wherein the manipulating means comprise actuators, all of which are located outside the tight chamber.

* * * * *